(12) United States Patent
Kim

(10) Patent No.: US 9,645,474 B2
(45) Date of Patent: May 9, 2017

(54) CAMERA MODULE HAVING AN AUTO FOCUS ADJUSTMENT FUNCTION

(71) Applicant: LG INNOTEK CO., LTD., Seoul (KR)

(72) Inventor: Changhyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/643,885

(22) Filed: Mar. 10, 2015

(65) Prior Publication Data

US 2015/0185587 A1 Jul. 2, 2015

Related U.S. Application Data

(63) Continuation of application No. 13/518,807, filed as application No. PCT/KR2010/009300 on Dec. 23, 2010, now Pat. No. 8,994,875.

(30) Foreign Application Priority Data

Dec. 23, 2009 (KR) .................. 10-2009-0130195

(51) Int. Cl.
*H04N 5/232* (2006.01)
*G03B 13/36* (2006.01)
(Continued)

(52) U.S. Cl.
CPC .............. *G03B 13/36* (2013.01); *G02B 7/08* (2013.01); *G02B 13/001* (2013.01);
(Continued)

(58) Field of Classification Search
CPC .................................................... H04N 5/2254
(Continued)

(56) References Cited

U.S. PATENT DOCUMENTS 3,913,113 A * 10/1975 Yamashita ............. G03B 29/00
396/503
4,749,269 A * 6/1988 Nakashima ............. G02B 7/10
359/696
(Continued)

FOREIGN PATENT DOCUMENTS

JP 2005-308960 A 11/2005
JP 2008026923 * 2/2008
(Continued)

*Primary Examiner* — Joel Fosselman
(74) *Attorney, Agent, or Firm* — Birch, Stewart, Kolasch & Birch, LLP

(57) ABSTRACT

The present invention relates to a camera module having an auto focus function, the module including a lens unit having at least one lens, a barrel into which the lens unit is inserted, and connected by a VCM (Voice Coil Motor) actuator, and an image sensor discretely positioned from the lens unit to convert light having passed the lens unit to an electrical signal, where the VCM actuator includes a gap of a reference distance position value which is a position of an object catering to a lens focal length according to the camera module, and information on a focus-met lens position value, and adjusts an initial position of the lens by using the gap of reference distance position value of the lens position value during operation of the camera module.

15 Claims, 4 Drawing Sheets

(51) Int. Cl.
*G02B 7/08* (2006.01)
*G02B 13/00* (2006.01)
*H02K 41/035* (2006.01)
*H04N 5/225* (2006.01)

(52) U.S. Cl.
CPC ....... *H02K 41/0356* (2013.01); *H04N 5/2254* (2013.01); *H04N 5/2257* (2013.01); *H04N 5/232* (2013.01); *H04N 5/23296* (2013.01); *G02B 13/004* (2013.01)

(58) Field of Classification Search
USPC .......................................... 348/357; 359/697
See application file for complete search history.

(56) References Cited

U.S. PATENT DOCUMENTS

| | | | |
|---|---|---|---|
| 2007/0047942 A1* | 3/2007 | Chang | G02B 7/08 396/133 |
| 2007/0188930 A1* | 8/2007 | Wei | G11B 5/5569 360/265.8 |
| 2007/0242152 A1 | 10/2007 | Chen | |
| 2009/0161232 A1* | 6/2009 | Iwasaki | G02B 7/102 359/697 |
| 2010/0110270 A1 | 5/2010 | Sekimoto et al. | |

FOREIGN PATENT DOCUMENTS

| | | |
|---|---|---|
| KR | 10-2004-0039913 A | 5/2004 |
| KR | 10-2009-0118178 A | 11/2009 |
| WO | WO 2009/011547 A1 | 1/2009 |

\* cited by examiner

CAMERA MODULE HAVING AN AUTO FOCUS ADJUSTMENT FUNCTION

CROSS-REFERENCE TO RELATED APPLICATIONS

This application is a Continuation of co-pending application Ser. No. 13/518,807 filed on Dec. 10, 2012, which is the national phase of PCT International Application No. PCT/KR2010/009300 filed on Dec. 23, 2010, and which claims priority to Application No. 10-2009-0130195 filed in the Republic of Korea on Dec. 23, 2009. The entire contents of all of the above applications are hereby incorporated by reference.

TECHNICAL FIELD

The present invention relates to a camera module camera module having an auto-focus function.

BACKGROUND ART

Digital camera modules are currently being incorporated into a variety of host devices. Such host devices include cellular telephones, personal data assistants (PDAs), computers, and so forth. Consumer demand for digital camera modules in host devices continues to grow.

The camera modules having auto focus adjusting function is configured such that a barrel protecting a conventional lens unit is coupled to a bobbin wounded by a coil via a screw, where the bobbin is interposed between a holder adhesively contacted at a floor surface thereof to a printed circuit board and a motor base.

However, the thus-configured camera module is disadvantageous in that an optical tilt and shift may be generated by unevenness of adhesive coated for assembling multiple components and assembly tolerance in components to decrease the quality of images due to accumulated errors. Another disadvantage is that separate focus adjustment process is inevitably needed after assembly of each component due to the assembly tolerance in components.

DISCLOSURE

Technical Problem

The present invention is disclosed to provide a camera module configured to integrate bobbins including a barrel and a coil to minimize an optical tilting and to free a separate manual focus adjusting process after assembly of each component.

Technical problems to be solved by the present invention are not restricted to the above-mentioned, and any other technical problems not mentioned so far will be clearly appreciated from the following description by skilled in the art.

Technical Solution

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a camera module having an auto focus adjustment function, the camera characterized by: a lens unit including at least one lens; a barrel into which the lens unit is inserted, and connected by a VCM (Voice Coil Motor) actuator; and an image sensor discretely positioned from the lens unit to convert light having passed the lens unit to an electrical signal, where the VCM actuator includes a gap of a reference distance position value which is a position of an object catering to a lens focal length according to the camera module, and information on a focus-met lens position value, and adjusts an initial position of the lens by using the gap of reference distance position value of the lens position value during operation of the camera module.

In another general aspect of the present invention, there is provided a camera module, characterized by: a lens unit including at least one lens; a barrel into which the lens unit is inserted; and a barrel-connected VCM (Voice Coil Motor) actuator adjusting an initial position of the lens by using a gap of a reference distance position value which is a position of a lens focus-met object or information on a lens position value at a focus-met area.

Advantageous Effects

The camera module having an auto focus adjusting function according to the present invention has an advantageous effect in that a barrel and a bobbin are integrated to minimize a defect in picture image by an optical tilting generated by assembly tolerance in a plurality of components, and to shorten an assembly process of components to remove a separate manual focus adjusting process during manufacturing of the camera module and to save the manufacturing cost.

DESCRIPTION OF DRAWINGS

The teachings of the present invention can be readily understood by considering the following detailed description in conjunction with the accompanying drawings, in which.

BEST MODE

Figure 1:
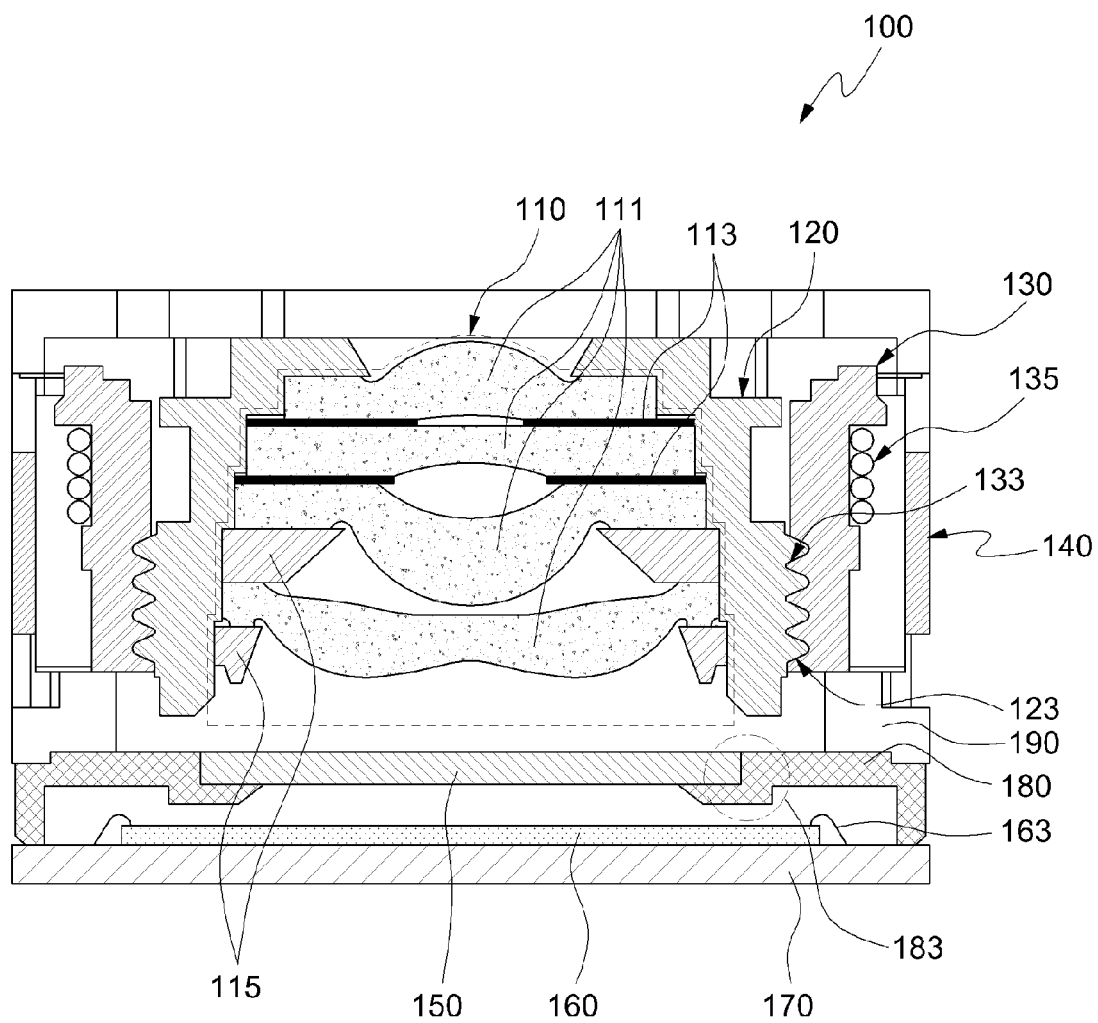
FIG. 1 is a cross-sectional view illustrating an example of a camera module having an auto focus adjusting function.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the invention. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Now, the present invention will be described in detail with reference to the accompanying drawings.

FIG. 1 is a cross-sectional view illustrating an example of a camera module having an auto focus adjusting function.

A camera module (100) having an auto focus adjusting function may include a lens unit (110), a barrel (120), a bobbin (130), a magnet (140), an infrared filter (150), an image sensor (160), a printed circuit board (170), a holder (180) and a motor base (190).

The lens unit (110) may include a blocking member (113) for blocking light among a plurality of lenses (111) and a plurality of lenses (111), and a spacer (115) for maintaining a gap among the plurality of lenses (111).

The barrel (120) functions to protect the lens unit (110) by being inserted into the lens unit (110) and is formed at a bottom periphery with a screw thread (123). The bobbin (130) is formed with a screw thread (133) at an inner side corresponding to the screw thread (123) formed at the barrel (120) to be coupled to the barrel (120) through the screw thread (133) and wound with a coil (135) therearound.

The magnet (140) is discretely positioned from the coil (135) of the bobbin (130). In a case a current is applied to the coil (135) of the bobbin (130) to a predetermined direction, an electromagnetic force is generated from a magnetic field of the magnet (140), whereby a force is generated to linearly move the bobbin (130) and the barrel (120) coupled to the bobbin (130) upward or downward. Focuses of the plurality of lenses (111) can be adjusted by adjusting the intensity of the current and by adjusting position of the barrel (120).

At this time, a separate focus adjusting process is needed in the course of assembling the barrel (120) and the bobbin (130) adjusting the position of the barrel (120), because screw fastening method is employed.

The infrared filter (150) is positioned at the bottom of the lens unit (110), and is also positioned inside a support (183) extended from a holder (180) supportively attached at a floor surface by an adhesive to a printed circuit board (170. described later), where light collected at the lens unit (110) and removed of infrared component by the infrared filter (150) is irradiated to the image sensor (160).

A floor surface of a motor base (190) is attached upward of the holder (180), where the motor base (190) may be contacted on an upper surface thereof by a floor surface of the bobbin (130), in a case the bobbin (130) is moved downward, and serves as a support as the bobbin (130) is linearly moved upward or downward. The image sensor (160) is discretely positioned at a bottom of the infrared filter (150) and converts an optical image filtered of infrared component by the infrared filter (150) to an electrical signal. At this time, the image sensor (160) and the lens unit (110) are aligned on the same optical axis.

The printed circuit board (170. PCB) is formed with a predetermined electrical pattern and a plurality of electrodes (not shown). The PCB (170) is attached to a rear surface of the image sensor (160) by an adhesive such as epoxy, and is electrically connected to the image sensor (160) via a bonding wire (163).

Figure 2:
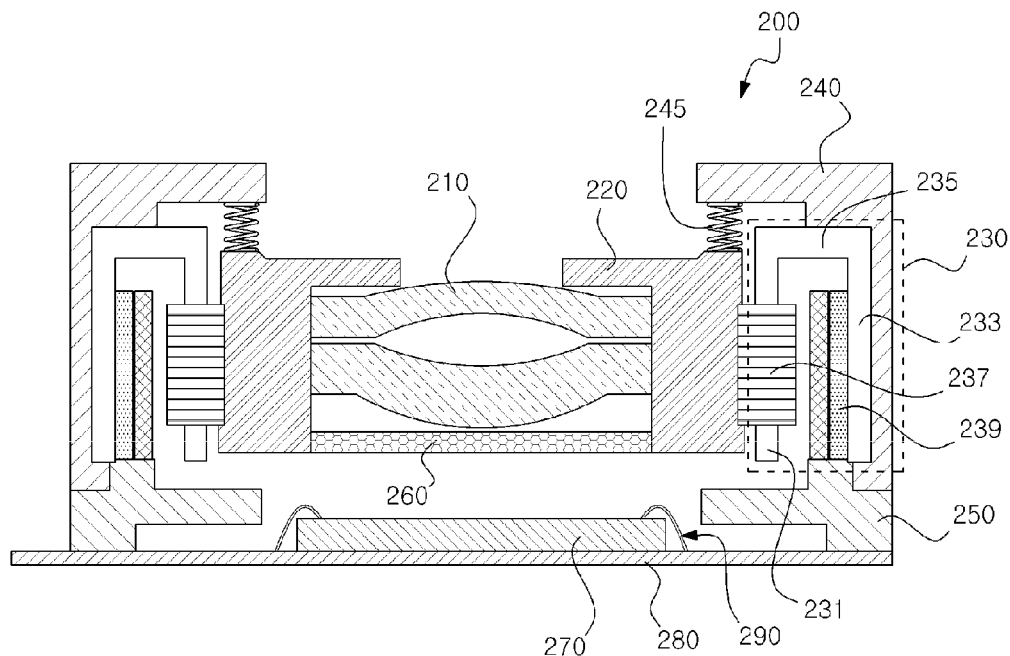
FIG. 2 is a cross-sectional view illustrating a camera module having an auto focus adjusting function according to an exemplary embodiment of the present invention.

FIG. 2 is a cross-sectional view illustrating a camera module having an auto focus adjusting function according to an exemplary embodiment of the present invention.

Referring to FIG. 2, a camera module (200) having an auto focus adjusting function may include a lens unit (210), a barrel (220), a VCM (Voice Coil Motor) actuator (230), a housing (240), a magnet support block (250), an infrared filter (260), an image sensor (270), a printed circuit board (280), and a bonding wire (290).

The lens unit (210) may include a plurality of lenses, a blocking member for blocking light among a plurality of lenses and a spacer (not shown) for maintaining a gap among the plurality of lenses. The barrel (220) functions to protect the lens unit by being inserted into the lens unit, and is attached at a periphery by a coil (237) wound on an inner yoke (231).

The barrel (220) may include a coil (237) at a periphery in various shapes, in addition to the shape illustrated in FIG. 2. For example, the coil (237) may be wound along a circumference of the barrel (220). The barrel (220) is attached with the VCM actuator (230), where the VCM actuator (220) includes yokes (231, 233, 235), the coil (237), a magnet (239) and a VCM actuator driver for driving the VCM actuator.

The magnet (239) is attached to the outer yoke (233) to be supported by the magnet support block (250), and discretely positioned from the coil (238) attached to the barrel (220). The yoke formed with the magnet (239) and the coil (237) include the inner yoke (231), the outer yoke (233) and the yoke support (235). The yoke is inserted into the housing (240), and a spring (245) is attached to an inner side of a portion crosswise extended from an upper surface of the housing (240). The spring (245) provides an elasticity to allow the barrel (220) to linearly and vertically move.

A magnetic flux is formed from the magnet (239) toward the coil (237). For example, in a case a current flows in the coil (237) toward a ground, a force is formed upwards of the coil (237) according to Fleming's left hand rule. Therefore, the coil (237), the barrel (220) integrated with the coil (237) and the lens unit (210) inserted into the barrel (220) vertically move. The coil (237) is connected to the VCM actuator driver for driving the VCM actuator, and current flowing in the coil (237) is controlled by the VCM actuator driver.

Now, the VCM actuator driver will be described in detail with reference to FIG. 3.

The infrared filter (260) is inserted into the barrel (220) from the bottom of the lens unit (210), where light collected at the lens unit (210) is removed of infrared component by the infrared filter (260) and is irradiated to the image sensor (270).

The image sensor (270) is discretely positioned at a bottom of the infrared filter (260) and converts an optical image filtered of infrared component by the infrared filter (260) to an electrical signal.

The printed circuit board (280. PCB) is formed with a predetermined electrical pattern and a plurality of electrodes (not shown). The PCB (280) is attached to a rear surface of the image sensor (270) by an adhesive such as epoxy, and is electrically connected to the image sensor (270) via the bonding wire (290).

Figure 3:
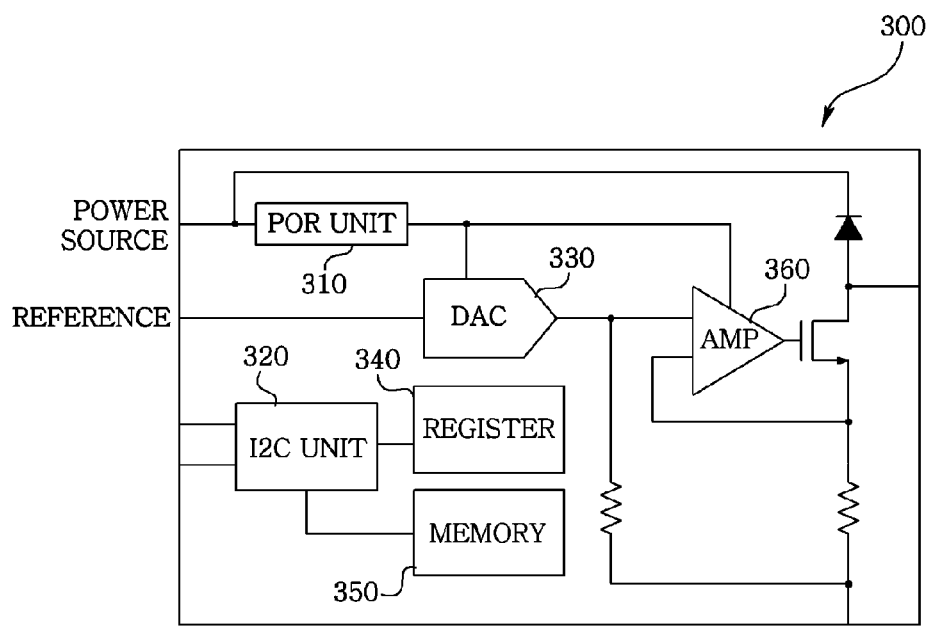
FIG. 3 is a block diagram illustrating a VCM actuator driver according to an exemplary embodiment of the present invention.

FIG. 3 is a block diagram illustrating a VCM actuator driver according to an exemplary embodiment of the present invention.

Referring to FIG. 3, the VCM actuator driver may include a POR (Power On Reset) unit (310), 12C unit (320), a DAC (Digital-to-Analog Converter. 330), a register (340), a memory (350) and an AMP (Amplifier. 360).

The POR unit (310) drives a device after a predetermined period of delay until a stable power is supplied at an initial power application. 12C unit (320) receives an AF command algorithm signal by moving the lens unit (210) and performing the autofocusing. The DAC (330) receives a digital signal and outputs an analog signal, and in the present exemplary embodiment, the DAC (330) outputs a current in an analog signal.

The register (340) inputs the digital signal outputted from the I2C unit (320) to the DAC (330), and includes a code value that indicates a current value in a bit value, and a matched current table. The memory (350) stores a hysterisis table which is a table showing an upward position value and a downward position value of the VCM actuator based on each code value, and in the present exemplary embodiment, the memory (350) stores a lens position value to a gap of a reference distance position value or to a focus-matching point caused by a tolerance of the camera module by adjusting a lens position to a focus-matching point during manufacturing of the camera module. Therefore, the DAC (330) outputs a current value based on the initial lens position value. The AMP (360) performs a buffering function that gain-boots the output value of the DAC (330).

Figure 4:
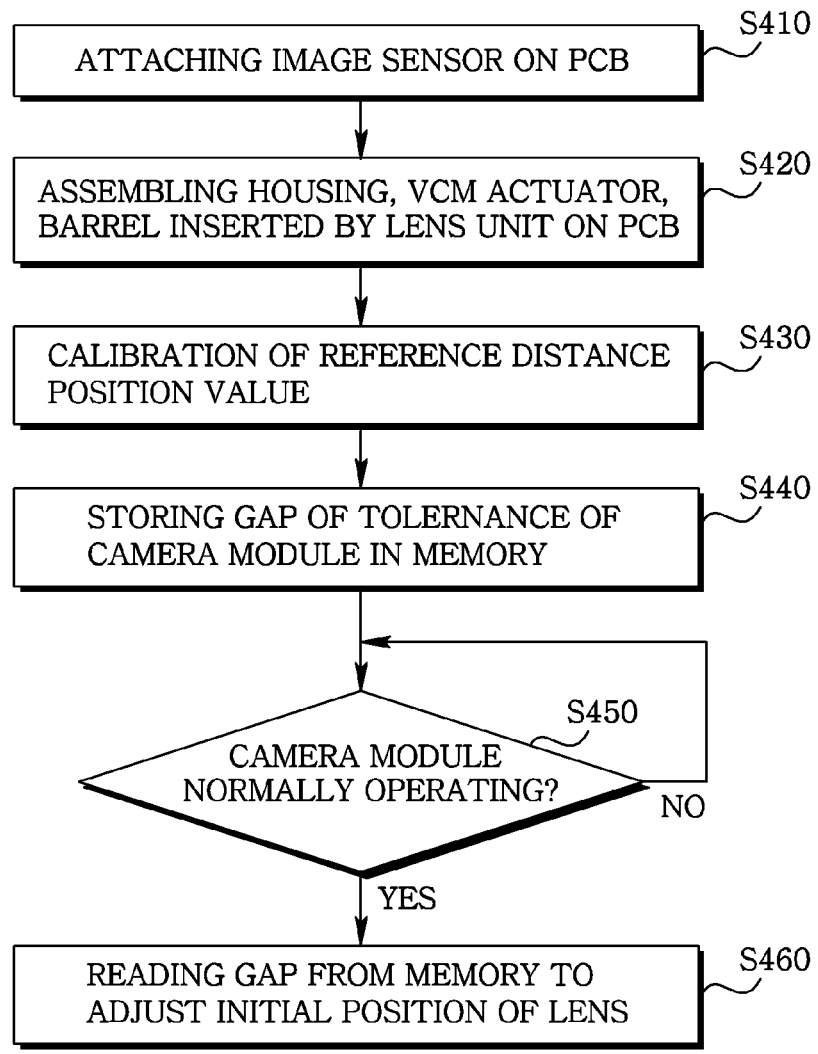
FIG. 4 is a flowchart illustrating an example of a camera module having an auto focus adjusting function according to an exemplary embodiment of the present invention.

FIG. 4 is a flowchart illustrating an example of a camera module having an auto focus adjusting function according to an exemplary embodiment of the present invention.

Referring to FIG. 4, an image sensor is attached to the printed circuit board (S410). Successively, the housing, the VCM actuator and the barrel inserted by lens unit are assembled on the printed circuit board (S420). The reference distance position value is calibrated by the assembled camera module (S430).

MODE FOR INVENTION

Figure 5:
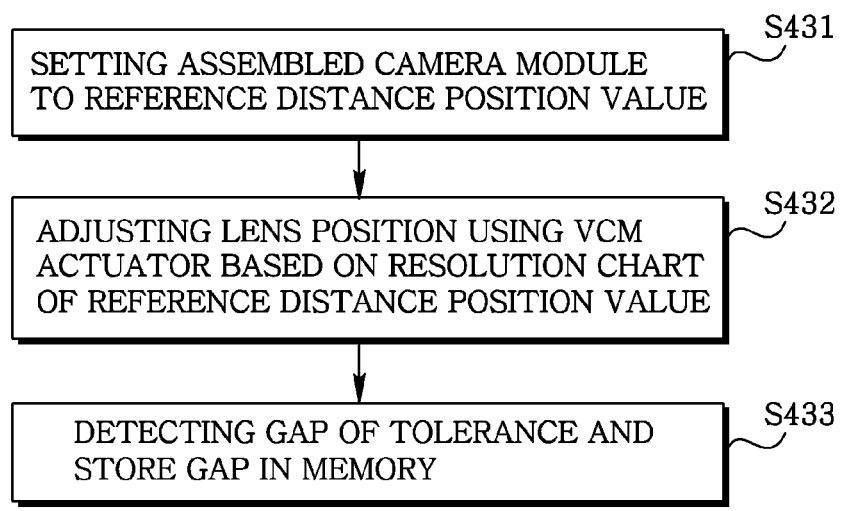
FIG. 5 is a flowchart illustrating a method of calibrating a reference distance position value according to an exemplary embodiment of the present invention.

FIG. 5 is a flowchart illustrating a method of calibrating a reference distance position value according to an exemplary embodiment of the present invention.

Referring to FIG. 5, the assembled camera module is set up to the reference distance position value (S431), where the reference distance position value is defined by a position of a lens focus-matched object according to the camera module. Then, the lens position is adjusted from the reference distance position value to a focus-matched point using the VCM actuator based on resolution chart (S432).

To be more specific, a resolution specification relative to the resolution chart is detected from the reference distance position value to upwardly or downwardly adjust the lens position to correspond to a standard resolution, whereby the lens position is adjusted to a focus-matched point.

Successively, the lens position is adjusted to a point where focusing is not matched, and a lens position value to a gap of reference distance position value caused by tolerance of the camera module or to a point where focusing is matched is stored in the memory (S433).

The calibration of reference distance position value according to the exemplary embodiment of the present invention may be implemented by connecting the assembled camera module to a reference distance position value calibration module performing the steps from S431 to S433.

Referring to FIG. 4 again, in a case the camera module is normally operated (S450), a gap of a reference distance position value caused by tolerance stored in the memory when the camera module is initially used, or a lens position value to a focus-matched point is read to adjust an initial position of the lens by using the gap of the reference distance position value or the lens position value (S460).

The terms of 'unit' described in the exemplary embodiments may include software components or hardware components such as FPGAs (Field-Programmable Gate Arrays) or ASICs (Application Specific Integrated Circuits), or a combination of these, and the operations and functions described herein can be implemented by the 'unit'.

However, the 'unit' may not be limited to software or hardware components. For example, the 'unit' may be configured in addressable storage media, or may be configured to reproduce one or more processors.

Therefore, for example, the 'unit' may include components such as software components, object-oriented software components, class components and task components, and may include processors, functions, attributes, procedures, sub-routines, segments of program codes, drivers, firmware, micro codes, circuits, data, database, data structures, tables, arrays and variations.

Functions provided in the components and the 'unit' may be coupled with lesser numbers of components and 'units', or may be further divided into additional components and 'units'. Furthermore, the components and 'units' may be implemented to reproduce one or more CPUs in a device or a security multimedia card.

All the functions described above may be implemented by software coded to perform the functions, microprocessors based on program codes, controllers, micro controllers, and processors such as ASICs (Application Specific Integrated Circuits). Designs, developments an implementations of codes should be apparent to skilled in the art based on the description of the present invention.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

INDUSTRIAL APPLICABILITY

The present invention has an industrial applicability in that function of a bobbin of VCM actuator can be implemented by a barrel and a spring, a picture image defect caused by optical tilt generated by tolerance of components is minimized by removing the bobbin, and assembly process of components can be reduced.

The invention claimed is:

1. A camera module having an autofocus adjustment function, the camera module comprising:
   a housing having an opening;
   a lens unit including at least one lens and a barrel into which the lens is inserted;
   a spring elastically supporting the barrel relative to the housing;
   a VCM (Voice Coil Motor) actuator coupled to the lens unit for moving the lens unit;
   an image sensor discretely positioned from the lens unit;
   a PCB (Printed Circuit Board) coupled to the image sensor; and
   a memory stored with an initial position value of the lens unit,
   wherein the VCM actuator includes a magnet forming a magnetic flux, a coil discretely positioned from the magnet and a yoke for attaching the magnet,
   wherein the yoke includes an inner yoke, an outer yoke distanced from the inner yoke, and a support yoke connecting the inner yoke and the outer yoke,
   wherein the coil is disposed to wrap the inner yoke,
   wherein the magnet is disposed at the outer yoke to face the coil,
   wherein the spring is disposed between an upper surface of the barrel and a lower surface of the housing adjacent to the opening, and
   wherein the VCM actuator moves the lens unit to adjust a position of the lens unit by using the initial position value of the lens unit stored in the memory when the VCM actuator is driven for an autofocus adjustment.

2. The camera module of claim 1, wherein the VCM actuator adjusts an initial position of the lens unit by using the initial position value of the lens unit stored in the memory when the VCM actuator is initially driven.

3. The camera module of claim 1, further comprising a VCM actuator driver configured to drive the VCM actuator, and wherein the memory is included in the VCM actuator driver.

4. The camera module of claim 1, wherein the coil is wound at a periphery of the inner yoke.

5. The camera module of claim 4, wherein the VCM actuator is driven by controlling a current flowing in the coil.

6. The camera module of claim 1, wherein the initial position value of the lens unit is obtained through calibration of a reference distance position value.

7. The camera module of claim 1, wherein the lens unit includes a plurality of lenses, a blocking member configured to block light in the plurality of lenses, and a spacer configured to maintain a gap in the plurality of lenses.

8. The camera module of claim 1, wherein the coil is attached to a periphery of the barrel.

9. The camera module of claim 8, wherein the barrel of the lens unit is connected to the housing by the spring.

10. The camera module of claim 1, further comprising an infrared filter interposed between the lens unit and the image sensor.

11. A mobile phone comprising the camera module of claim 1.

12. The camera module of claim 9, wherein the inner yoke, the outer yoke and the barrel are positioned inside the housing.

13. The camera module of claim 1, wherein the image sensor is discretely positioned from the lens unit to convert light having passed the lens unit to an electrical signal.

14. The camera module of claim 1, wherein the yoke including the inner yoke and the outer yoke is inserted in the housing.

15. The camera module of claim 13, wherein the PCB is electrically connected to the image sensor via a bonding wire.

* * * * *